(12) United States Patent
Adeline et al.

(10) Patent No.: US 9,973,115 B2
(45) Date of Patent: May 15, 2018

(54) METHOD FOR DETECTING THE POSITION OF A WIPER ARM FOR A VEHICLE WINDOW WIPING SYSTEM

(71) Applicant: Valeo Systèmes d'Essuyage, Le Mesnil Saint Denis (FR)

(72) Inventors: Romain Adeline, Versailles (FR); Aymeric Koniec, Chilly-Mazarin (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 701 days.

(21) Appl. No.: 14/494,782

(22) Filed: Sep. 24, 2014

(65) Prior Publication Data

US 2015/0082576 A1     Mar. 26, 2015

(30) Foreign Application Priority Data

Sep. 24, 2013   (FR) ...................................... 13 59166

(51) Int. Cl.
*B60S 1/04*     (2006.01)
*H02P 3/08*     (2006.01)
*B60S 1/08*     (2006.01)
*B60S 1/34*     (2006.01)

(52) U.S. Cl.
CPC .............. *H02P 3/08* (2013.01); *B60S 1/0452* (2013.01); *B60S 1/08* (2013.01); *B60S 1/3413* (2013.01)

(58) Field of Classification Search
CPC ........ H02P 3/08; B60S 1/0452; B60S 1/0469; B60S 1/0896; B60S 1/08; B60S 1/3413; B60S 1/342; B60S 1/0874–1/0888
USPC ........ 73/7, 865.9, 432.1; 340/945, 963, 971, 340/425.5, 434, 438, 679, 686.1
See application file for complete search history.

(56) References Cited

U.S. PATENT DOCUMENTS

| | | | |
|---|---|---|---|
| 5,909,096 A * | 6/1999 | Detais ....................... | B60S 1/08 15/250.17 |
| 2004/0145364 A1* | 7/2004 | Onishi ............... | B62D 15/0215 324/207.2 |
| 2008/0196190 A1* | 8/2008 | Tisch ....................... | B60S 1/08 15/250.17 |

* cited by examiner

*Primary Examiner* — Robert R Raevis
(74) *Attorney, Agent, or Firm* — Osha Liang LLP

(57) ABSTRACT

Method for detecting the position of a wiper arm (5) for a system (1) for wiping a vehicle window (3), comprising the steps consisting in:
 a) measuring or estimating (35) at least one parameter for determining the maintenance or service position,
 b) comparing (37) the measured or estimated value of said parameter with a reference value or a range of reference values, and
 c) determining, from the results of the comparison, whether the wiper arm is in maintenance or service position.

13 Claims, 2 Drawing Sheets

METHOD FOR DETECTING THE POSITION OF A WIPER ARM FOR A VEHICLE WINDOW WIPING SYSTEM

TECHNICAL FIELD

The present invention relates to a method for detecting the position of a wiper arm for a vehicle window wiping system.

STATE OF THE ART

A vehicle windscreen wiping system notably comprises at least one wiper blade borne by a wiper arm and a motor for driving the wiper arm so that the blade is driven by the wiper arm wiping the windscreen, in a cyclic rotational movement, substantially in the form of a portion of a circle, about an axis of rotation.

The wiper arm comprises an end articulated on a part of the vehicle and can be displaced, generally manually, from a so-called service position in which the blade that it bears is in contact with the windscreen and is able to be driven by the wiper arm to wipe the windscreen, and a so-called maintenance position in which the blade is not in contact with the windscreen. The wiper arm can be set to the maintenance position, for example, to clean the blade, replace it if it is worn or protect it from ice formed on the windscreen in winter.

It is found that, if the wiper arm is driven by the motor when it is in its maintenance position, the wiper arm or the blade that it bears can strike a part of the vehicle, such as its bonnet, which can result in damage to the vehicle and destruction of the wiping system.

This problem relates particularly to the type of wiping system for which the wiper arm is in a storage position, for example under the bonnet of the vehicle, when the system is inactive. The wiper arm cannot be accessed in this storage position and cannot be brought directly from this position to a maintenance position. A specific command from the system, from the interior of the vehicle, makes it possible to displace the wiper arm from its storage position to an intermediate position in which it is accessible and the blade that is bears it bearing on the windscreen. The wiper arm can then be displaced manually from this intermediate position to a maintenance position in which the blade is no longer in contact with the windscreen.

The invention proposes a simple, effective and economical solution to the abovementioned problem.

EXPLANATION OF THE INVENTION

The invention to this end proposes a method for detecting the position of a wiper arm for a system for wiping a vehicle window, this system comprising:
at least one wiper blade borne by said wiper arm that can be displaced from a so-called maintenance position in which said wiper blade is not in contact with said window, to a so-called service position in which said wiper blade is in contact with said window, at least one motor for driving said wiper arm, and at least one control unit for controlling said motor, said method comprising the steps consisting in: asuring or estimating at least one parameter for determining the maintenance or service position, comparing the measured or estimated value of said parameter with a reference value or a range of reference values, an determining, from the results of the comparison, whether said wiper arm is in maintenance or service position. Preferably, said parameter is chosen from the electrical consumption of said motor, the output torque of said motor, the friction torque of said wiper blade on said window and the friction coefficient of said wiper blade on said window.

When the wiper arm is in its service position and it is driven by the motor, a friction occurs between the window and the blade which is sliding on the window, this friction being characterized by a friction coefficient. This friction causes a friction torque which opposes the output torque of the motor. The greater the friction torque, the greater the output torque of the motor has to be to drive the wiper arm at a given speed. Furthermore, the greater the output torque of the motor, the greater the electrical consumption of the motor. On the other hand, when the friction is zero, because the blade is not in contact with the window of the vehicle, the output torque of the motor and the current consumption of the motor are relatively low when the system is active.

The invention thus proposes a method that makes it possible to determine whether a wiper blade is or is not in contact with a window of a vehicle, the blade being in contact with the window when the wiper arm is in so-called service (or intermediate) position and is not in contact with the window when the wiper arm is in so-called maintenance position. According to the invention, at least one parameter is studied, the study of this parameter amounting to studying the force necessary to the wiping system to displace the blade. The comparison of the measured or estimated value to the reference value or range of reference values makes it possible to easily determine whether the wiper arm is or is not in its maintenance position. The management of the result of this comparison can make it possible to alert the driver in the car interior, to stop or immobilize the actuation of the motor. The parameter studied is advantageously estimated (and not calculated) to avoid equipping the system with a sensor for measuring this parameter.

The steps a) to c) of the method can follow the reception by the control unit of a command to drive said wiper arm, emitted for example from the vehicle interior. Thus, on each start up cycle, the system can check the position of the wiper arm to avoid the risk of destruction to the system.

The steps a) to c) of the method are preferably performed at an instant t. The estimation of the parameter is not then performed during a time period but is, on the contrary, performed instantaneously.

The steps a) to c) can directly precede or follow a step of starting the driving of said wiper arm, preferably directly follow a step of starting the driving of the wiper arm.

The method can comprise:
an additional step d) of detecting a displacement of said wiper arm, and/or
an additional step e) of immobilizing or interrupting a displacement of said wiper arm.

In the case where steps a) to c) of the method are performed before the driving of the wiper arm, this driving can be immobilized/prevented (step e)) if the result in step c) indicates that the wiper arm is in its maintenance position. In the case where steps a) to c) are performed after a start of driving of the wiper arm (which would be detected by step d)), this driving can be interrupted (step e)) if the result of step c) indicates that the wiper arm is in its maintenance position.

Advantageously, the parameter is estimated and compared by the control unit of the wiping system.

According to a particular embodiment of the invention, the selected parameter is the friction coefficient of said wiper blade on said window. The comparison step of the method therefore consists in comparing an estimated value of the friction coefficient to a reference value or range of reference values.

In the case where the measured value is compared to a reference value, the latter can be equal to zero. When the estimated value of the friction coefficient is equal or close to zero, the control unit can deduce therefrom that the wiper arm is in its maintenance position and therefore that the blade is not in contact with the window.

In the case where the measured value is compared to a range of reference values, the latter can extend from zero to a threshold value, which is the minimum value of the friction coefficient of said wiper blade on said window, in particular when said window is wet. This threshold value can be determined empirically. Alternatively, the threshold value can be determined by simulation or by tribology. Alternativement, la valeur seuil peut être déterminée par simulation ou par tribologie.

A value of the friction coefficient can be estimated from an estimated value of the output torque of the motor, which can itself be estimated from an estimated value of the electrical consumption of the motor. All these estimations can be performed by the control unit of the wiping system. The estimations of the values are preferably instantaneous estimations, that is to say performed at an instant t.

The present invention relates also to a system for wiping a vehicle window, comprising:
  at least one wiper blade borne by said wiper arm that can be displaced from a so-called maintenance position in which said wiper blade is not in contact with said window, to a so-called service position in which said wiper blade is in contact with said window,
  at least one motor for driving said wiper arm, and
  at least one control unit for controlling said motor,
said system comprising a device suitable for:
a) measuring or estimating at least one parameter for determining the maintenance or service position,
b) comparing the measured or estimated value of said parameter with a reference value or a reference range of values, and
c) determining, from the results of the comparison, whether the wiper arm is in maintenance or service position.

The present invention relates also to a wiping system as defined above, in which said control unit for controlling the motor comprises said device suitable for performing the steps a) to c) mentioned above.

The invention relates also to a wiping system according to any one of the above definitions, in which said device is suitable for implementing the method for detecting the position of a wiper arm according to any one of the variants defined above.

The invention relates also to a vehicle, in particular a motor vehicle, characterized in that it comprises at least one wiping system according to any one of the variants defined above.

DESCRIPTION OF THE FIGURES

The invention will be better understood and other details, features and advantages of the invention will become apparent on reading the following description given as a nonlimiting example and with reference to the attached drawings in which.

DETAILED DESCRIPTION

Figure 1:
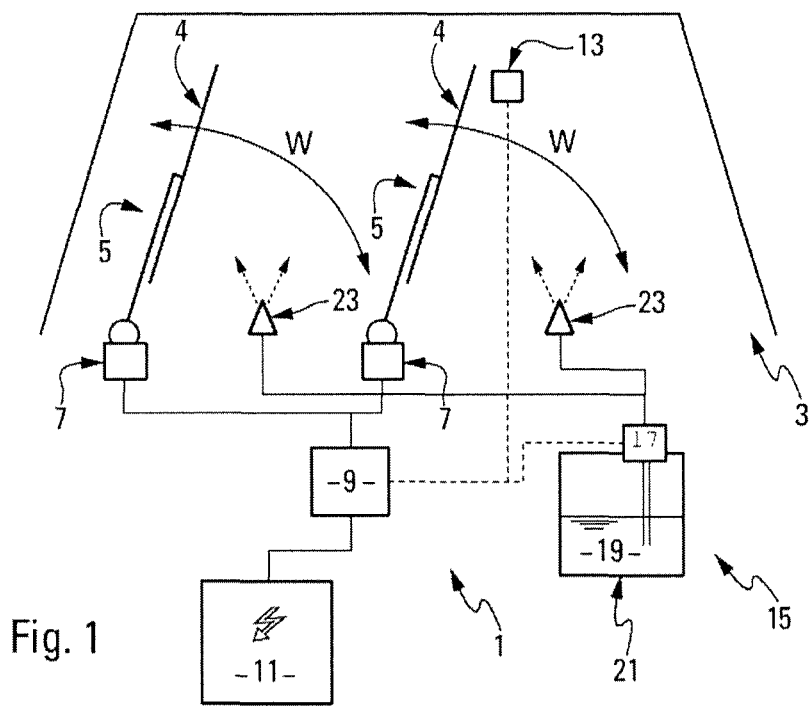
FIG. 1 is a very schematic view of a vehicle window wiping system, the wiper arms of this system being represented in their service position.
Figure 2:
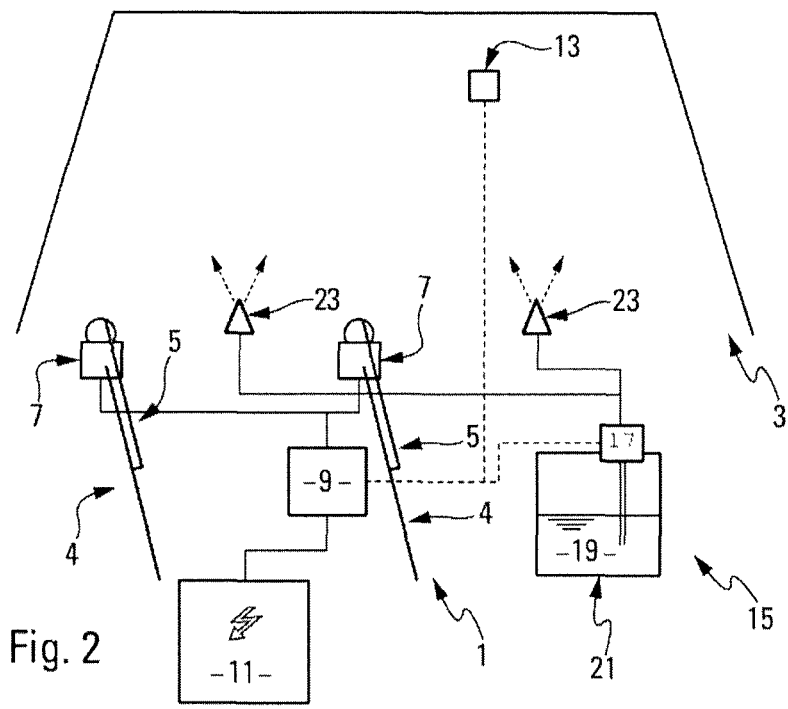
FIG. 2 is another very schematic view of the wiping system of FIG. 1, the wiper arms being represented in their maintenance position.

Reference should be made first of all to FIGS. 1 and 2 which represent one and the same system 1 for wiping a vehicle window 3, in particular a windscreen of a motor vehicle, this system here comprising two blades 4 for wiping the window 3, which are each borne by a wiper arm 5.

Each wiper arm 5 has an end linked to a motor 7 which is intended to drive the wiper arm 5 in wiping the window 3, in a cyclic rotational movement, substantially in the form of a portion of a circle, about an axis of rotation.

More specifically, each motor 7 comprises an output shaft which transmits a driving torque to the wiper arm 5, for example via rod linkage.

The motors 7 are electric and are linked to an electrical source 11, such as the battery of the vehicle or an alternator, via a control unit 9 of the system 1. This unit 9 is configured to manage the operation of the system 1 according to a number of predefined programs, for example by controlling the speed W of rotation of the wiper arms 5 based on the regulation of the current delivered to the motors 7, for a given voltage value.

The wiping system 1 here comprises a rain sensor 13 linked to the control unit 9. It also comprises a device 15 for cleaning the window 3, which comprises a pump 17 linked to the unit 9 and configured to take windscreen-washer liquid 19 from a container 21 and convey it to means for spraying liquid onto the window 3, these spraying means being, for example, nozzles 23 mounted on the bonnet of the vehicle.

The wiper arms 5 are represented in their service position in FIG. 1 and in their maintenance position in FIG. 2. In their service position, the wiper arms 5 are folded back to the window 3 and the blades 4 are in contact with the window 3. In this position, the wiper arms 5 can be displaced by actuating the motors 7, so that the blades 4 wipe the window 3.

In their maintenance position represented in FIG. 2, the wiper arms 5 are separated from the window 3 and the blades 4 are away from the window and are not therefore in contact therewith. In this position, the blades 4 can be cleaned or removed from the wiper arms 5 in order to replace them with new ones.

The present invention notably proposes a method for detecting whether the wiper arms 5 are in their service position or in their maintenance position, in order to limit the risks of damaging the system 1, in particular during its activation.

As is described above, the unit 9 notably controls the speed W with which the wiper arms 5 are driven based on the control of the electrical supply current for the motors 7, for a given voltage value.

Figure 3:
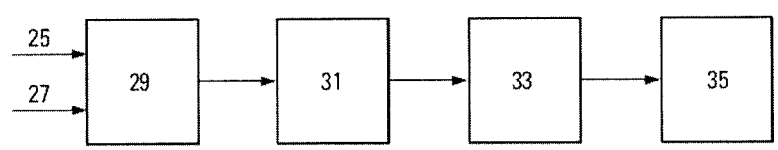
FIG. 3 is a very schematic view of a flow diagram representing parameter estimation steps for the implementation of the method according to the invention for determining the position of at least one wiper arm.

According to the invention, the unit 9 is, furthermore, configured to predict, notably on the basis of a given voltage value (reference 25 in FIG. 3) and of the position of the wiper arm 5 on the window 3 (reference 27), what the speed W with which the wiper arm 5 is driven should theoretically be (step referenced 29).

The control unit 9 is, furthermore, configured to estimate:
- from this speed W with which the wiper arm is driven, the current consumed by the motor 7 to ensure that the wiper arm is driven at this speed (step referenced 31),
- from the estimation of the current consumed by the motor 7, the output torque of the motor 7 (step referenced 33), and
- from the estimation of the output torque of the motor 7, the friction coefficient of the blade 4 on the window (step referenced 35).

Figure 4:
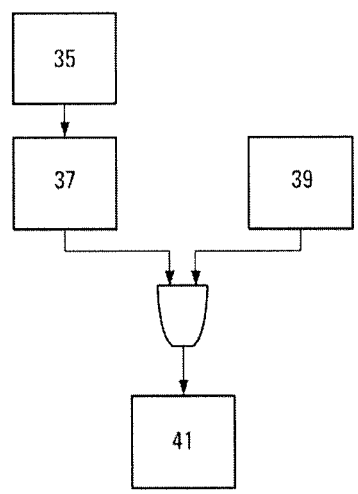
FIG. 4 is a very schematic view of another flow diagram representing steps of the method according to the invention.

According to a particular embodiment of the invention represented schematically in FIG. 4, the method comprises the following steps:
- a) estimating the friction coefficient of the blades 4 on the window 3 (abovementioned step 35),
- b) comparing the estimated value of the friction coefficient to a reference value or to a range of reference values (step 37), and
- c) determining whether the wiper arm is in its maintenance position or in its service position, from the results of the comparison.

As explained in the above, the estimation of the friction coefficient is performed by the unit 9. The comparison of values of the friction coefficient and the interpretation of the result are also performed by the unit 9.

In the present case, the estimated value of the friction coefficient can be compared by the unit 9 to a reference value, for example zero. A zero friction coefficient means that the displacement of the wiper arm 5 generates no friction between the blade 4 and the window 3 and therefore that the wiper arm 5 is in its maintenance position. This is possible only if the blade is not in contact with the window. In the case where the estimated value of the friction coefficient is equal to zero, or in the case where the control unit fails to measure or estimate the friction coefficient of said blade on said window (for example according to the estimation method of FIG. 3 as described above), the control unit considers that the blade 4 is not in contact with the window 3 and that the wiper arm 5 which bears this blade 4 is in a maintenance position.

As a variant, the estimated value of the friction coefficient can be compared by the unit 9 to a range of reference values, extending for example from zero to a threshold value, as described in the above. The threshold value can be slightly greater than zero.

The steps of the method can be implemented by the control unit 9 as soon as it receives a command to activate the driving of the wiper arms 5, from the vehicle interior. On reception of this command, the unit 9 can perform, in parallel with the steps a) to c), a step 39 of detecting the displacement of the wiper arms 5. In the case where the estimated value of the friction coefficient is equal to zero and a displacement of the wiper arms 5 is detected, the unit 9 can stop this displacement in order to avoid damaging the system (step 41).

As a variant, the unit 9 can be designed to block or prevent any displacement of the wiper arms 5, from the moment when the estimated value of the friction coefficient is equal to zero, and without any displacement of the wiper arms having been detected.

The unit 9 can perform the steps of the method for one of the wiper arms or for both. It is possible to envisage having one of the wiper arms in the service position while the other wiper arm is in the maintenance position. The control unit 9 is then able to identify which of the wiper arms is in its maintenance position and block the driving of this wiper arm. The driving of the other wiper arm can then be kept activated or be stopped.

In variants of the method according to the invention, the parameter studied by the control unit could be the output torque of the motor or the current consumption of the motor, this parameter being able to be estimated as described in the above.

The invention claimed is:

1. A method for detecting the position of a wiper arm for a system for wiping a vehicle window, the system comprising:
   at least one wiper blade borne by said wiper arm that can be displaced from a so-called maintenance position in which said wiper blade is not in contact with said window, to a so-called service position in which said wiper blade is in contact with said window,
   at least one motor for driving said wiper arm, and
   at least one control unit for controlling said motor, the method comprising:
   a) measuring or estimating at least one parameter for determining the maintenance or service position, wherein the at least one parameter comprises a friction coefficient of the wiper blade on the window;
   b) comparing the measured or estimated value of the friction coefficient with a reference value or a range of reference values; and
   c) determining, from the results of the comparison, whether said wiper arm is in maintenance or service position.

2. The method according to claim 1, wherein the at least one parameter further comprises at least one of: the electrical consumption of said motor, the output torque of said motor, and the friction torque of said wiper blade on said window.

3. The method according to claim 1, wherein the steps a) to c) follow the reception by the control unit of a command to drive said wiper arm.

4. The method according to claim 3, wherein the steps a) to c) directly precede or follow a step of starting the driving of said wiper arm, directly follow a step of starting the driving of said wiper arm.

5. The method according to claim 1, further comprising an additional step of detecting a displacement of said wiper arm.

6. The method according to claim 1, further comprising an additional step of immobilizing or interrupting a displacement of said wiper arm.

7. The method according to claim 1, wherein said at least one parameter is estimated and compared by the control unit.

8. The method according to claim 1, wherein said reference value is zero.

9. The method according to claim 1, wherein the range of reference values extends from zero to a threshold value, which is the minimum value of the friction coefficient of said wiper blade on said window, when said window is wet.

10. The method according to claim 9, wherein the threshold value is determined empirically.

11. The method according to claim 1, wherein a value of said friction coefficient is estimated from an estimated value of the output torque of said motor.

12. The method according to claim 11, wherein said value of the output torque of the motor is estimated from an estimated value of the electrical consumption of said motor.

13. The method according to claim 11, wherein the estimations of the values are instantaneous estimations.

\* \* \* \* \*